INVENTOR:
HANS VESTRE HUSE

INVENTOR:
HANS VESTRE HUSE

Feb. 11, 1958   H. V. HUSE   2,822,668
PRESSURE CONTROL FOR HYDRAULIC SYSTEMS
Filed Nov. 24, 1954   6 Sheets-Sheet 4

INVENTOR:
HANS VESTRE HUSE

Feb. 11, 1958     H. V. HUSE     2,822,668
PRESSURE CONTROL FOR HYDRAULIC SYSTEMS
Filed Nov. 24, 1954     6 Sheets-Sheet 5
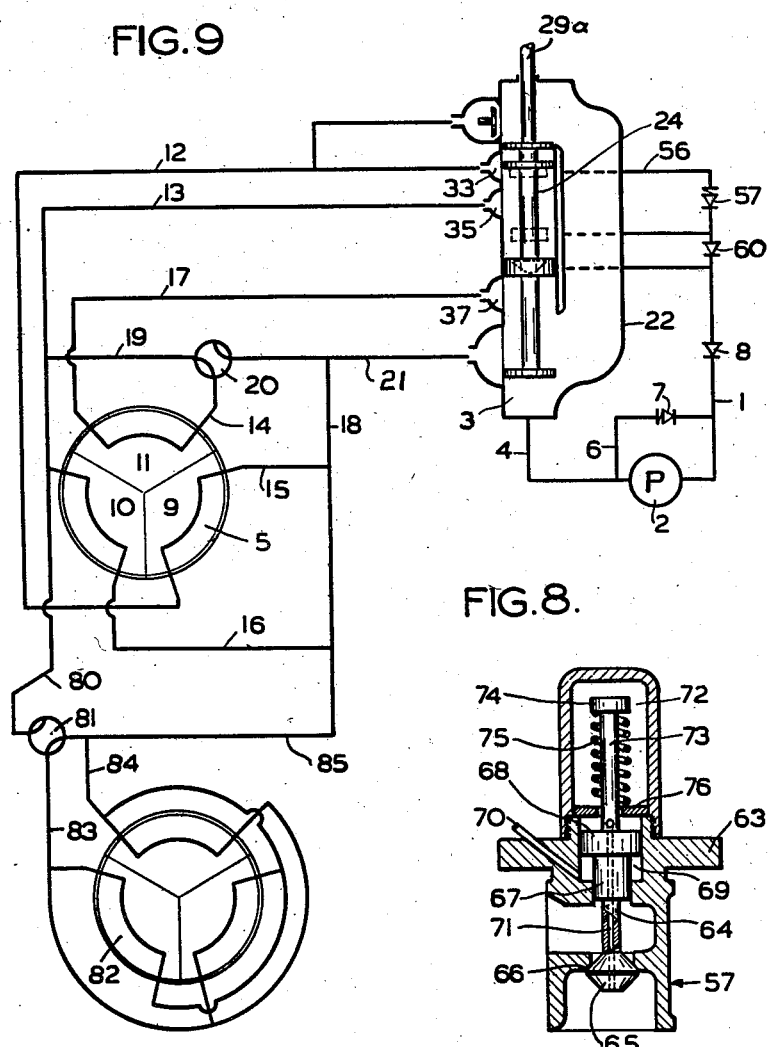
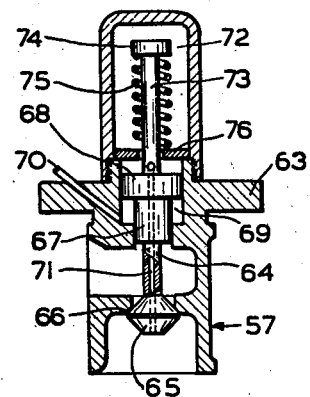
INVENTOR:
HANS VESTRE HUSE

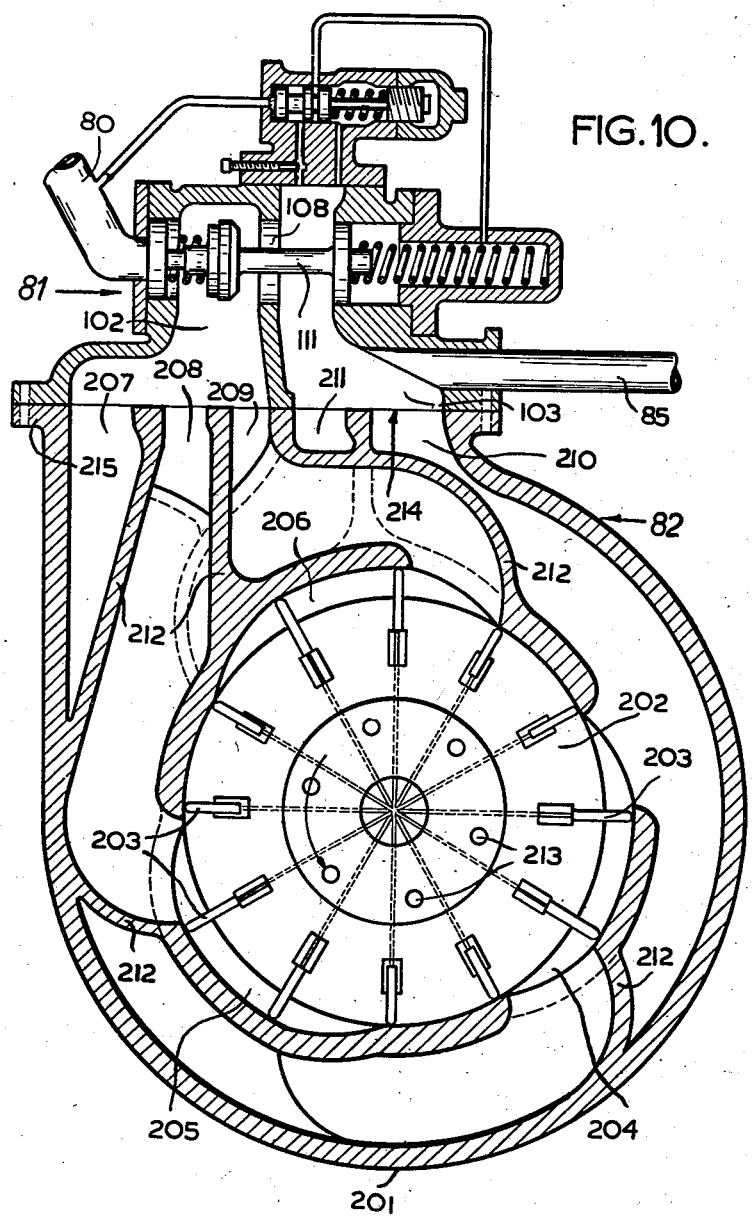

United States Patent Office 2,822,668
Patented Feb. 11, 1958

2,822,668

PRESSURE CONTROL FOR HYDRAULIC SYSTEMS

Hans Vestre Huse, Brattvaag, Norway, assignor to Hydraulik A/S, Brattvaag, Norway, a Norwegian company Application November 24, 1954, Serial No. 470,863

10 Claims. (Cl. 60—53)

This invention relates to hydraulic systems for winches and more specifically hydraulic winches for use in the handling of cargo and baggage on ships.

In accordance with a preferred embodiment of the invention, a hydraulic transmission system for a winch, comprises a source of pressure fluid, at least two fluid motor circuits connected in aiding mechanical relation to each other, a fluid circuit including a main supply line from the source to manually adjustable control means and a return line from the control back to the source, the manually adjustable control means being adapted for manual control of the feed of pressure fluid to one of the motor circuits, a branch leading from the inlet of that one motor circuit to the inlet of the other motor circuit, and pressure responsive control means for closing the branch at pressures below a certain value.

The term "motor circuit" is used herein to designate a single circuit in a hydraulic system running from a control means in a supply line to the discharge through an energy consuming—and thus pressure consuming—motor part. Such a "motor circuit" may be a conventional hydraulic simplex motor, two or more motors or motor chambers having joined inlets, or a number of motors or motor chambers connected in series.

It is assumed throughout this specification that the pump is of a kind supplying a constant amount of fluid irrespective of the back pressure in the system (the load). Such assumption is substantially fulfilled when employing a conventional rotary-vane pump driven by a constantly rotating prime mover. Although the present system is, in some respects, a pressure responsive system and is not normally to be used in connection with a constant pressure fluid source, the invention may also be embodied in a system employing a pressure fluid source wherein a change in load causes a certain decrease in the amount of fluid delivered from the source, but wherein such changes are too small to be of importance for the pressure response of the system. Further, the invention may also be used in connection with a known type of pump having a stepped supply of pressure fluid in accordance with the load, for example, a pump operating to deliver only half of the usual amount when the back pressure in the system exceeds a predetermined value.

However, the system is dealt with as if the assumption of a constant amount of fluid delivered by the pump is fulfilled at all loads, in order to facilitate understanding of the invention.

It must also be understood that the system is regarded as a unidirectional system so far as the different terms relating to "inlets" and "feed," and "outlets" and "discharge" for the motor circuits are concerned, although the fluid flows just as often in the opposite direction. This is because the present invention is concerned more particularly with a winch for the handling of cargo and the like. Thus, a positive back pressure occurs in the hoisting direction due to the weight of the load. The terms mentioned above therefore relate to the direction in which such a positive back pressure capable of driving the motors as pumps in the opposite direction, must be counteracted.

Further features of the invention will be apparent from the following description of particular embodiments thereof, given by way of example only, with reference to the accompanying drawings, wherein:

Figure 8 is a vertical section of a part in the system drawn to a larger scale.

Fig. 9 is a diagrammatic view of another embodiment of the present invention.

Figure 10 is a vertical section of parts incorporated in the embodiment of Figure 9.

Figure 1:
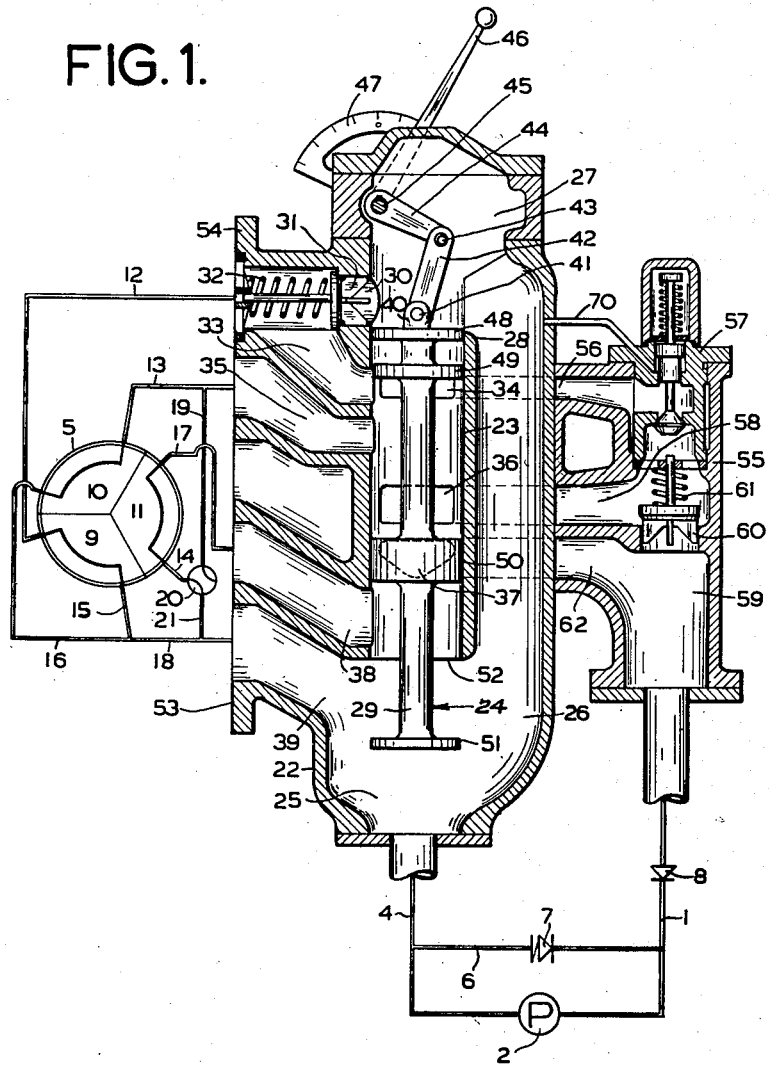
Figure 1 is a diagrammatic view of an hydraulic system according to one embodiment of the invention, with the manual control valve of the system being shown in section.

In the drawings some parts are represented by symbols in order to simplify the drawings. Thus, the motor, the pump and a special pressure responsive control device acting as a three way valve are shown symbolized in Figure 1. In Figures 2 to 7, all parts are shown in simplified form.

The symbol used for a check valve is a transverse line across a flow line, against which an apex of a triangle rests. The triangle is drawn with its apex opposing the fluid flow, so that such flow may pass from the transverse line and through the triangle, but is prevented from passing through the triangle towards and across the transverse line (see for example the valve 60).

When the base line of such a triangle symbol carries a Z, this symbol is used to indicate that the valve in question is springloaded with a substantial spring force, so that a relatively high oil pressure is necessary for the opening of such valve (see for example the safety valve 7).

The three way valve symbol will be easily understood.

Referring now to Figures 1 to 7, it will be seen that the hydraulic system comprises a main supply line 1 for supplying pressure fluid under varying pressures but with a constant volumetric speed from a non-reversible pump 2 to a manually adjustable control valve generally designated with the reference numeral 3. This manual control valve is adjustable for distributing the pressure fluid between a short circuit to a main return line 4 leading back to the pump or its reservoir, and different conduits leading to a hydraulic motor unit which is identified generally by the reference numeral 5.

A relief line 6 closed by a relief valve 7 connects the main supply line 1 with the main return line 4. The line 6 with its valve 7 constitutes a conventional safeguard against overload and breakdown in that the valve 7 opens or "blows" should the pressure exceed a certain maximum value.

A check valve 8 is placed in the main supply line 1 between the relief line 6 and the manual control valve 3. This check valve prevents any back flow from the motor through the pump 2 or the relief line 6, should the pump stop or the safety valve "blow."

The motor unit 5 is a so-called triplex motor having three motor circuits 9, 10 and 11, which are supplied with pressure fluid through individual feed conduits 12, 13 and 14 respectively. After passing through the motor circuits, the fluid from the circuits 9, 10 and 11 is led back through outlets 15, 16 and 17 respectively. The conduits extending from the outlets 15 and 16 are joined to a main discharge conduit 18, while the outlet 17 is individually connected to the manual control valve 3.

While the motor circuits 9, 10 are supplied with pressure fluid by the feed conduits 12, 13 which are individually connected to the valve 3, the third motor circuit 11 is supplied with pressure fluid from a branch conduit 19 which branches off from the feed conduit 13 of the motor circuit 10. This branch conduit 19 is connected to a pressure responsive control device 20 which controls the fluid supply to the feed conduit 14 and which alternatively connects this conduit 14 to either the branch line 19 or to a branch conduit 21 which branches off from the main discharge conduit 18.

The main discharge conduit 18 is shown as being connected to the manual control valve 3, but is in reality in constant communication with the main return line 4 through the valve 3.

The feed conduits 12 and 13 and the outlet conduit 17 are, as indicated above, individually connected to the manual control valve 3 and are controlled by that valve. This manual control valve is a slide valve which may be manually adjusted to positions in which the main supply line 1 is in free or throttle communication with some of the conduits 12, 13 and 17 and/or the return line 4 in certain combinations which are hereinafter discussed in detail.

The construction of the manual control valve 3 is apparent in Figure 1. The valve has a main housing 22 formed with an open ended cylindrical bore 23 in which an axially slideable slide member 24 is snugly received. The housing 22 is at its lower end provided with a main communication chamber 25 from which the main return line 4 extends back to the pump. A branch channel 26 leads from the lower chamber 25 to the upper part of the cylinder bore 23 and opens into an upper chamber 27. The opening into this upper chamber is partly located in the wall of the bore 23 and its lower part is defined by an edge 28 at the upper end of said wall.

In this respect it should be noted that the slide member 24 receives fluid pressures of exactly the same magnitudes against its upper and lower end faces, due to the fact that the chambers 27 and 25 are in constant communication with the discharge side of the hydraulic system. As the areas of the upper and lower end faces are identical, the slide member is axially unaffected by pressure differentials occurring in the system. When the slide member 24 has been set in one position, it cannot be displaced axially by pressure differences due to the back pressure in the system.

The slide member 24 comprises an axial valve stem 29 carrying flanges or lands for selective isolation of, or intercommunication between, several channels formed in the housing 22 and opening in the wall of the cylinder bore 23. Starting from the top, the housing 22 has a channel 30 arranged for communication between the upper chamber 27 and the feed conduit 12 of the motor circuit 9. This channel 30 is normally closed by a check valve 31 which is held against its seat by a lightly loaded return spring 32. The feed conduit 12 also communicates with a second channel 33 which opens into the bore 23 below the first channel 30 as well as below the upper edge 28. A first supply channel opening 34 opens into the cylinder bore 23 at the same axial height as the channel 33, whereby said opening 34 communicates freely with the channel 33 in every position of the slide member 24.

A third channel 35 is located below the second channel 33. The third channel 35 communicates with the feed conduit 13 of the second motor circuit 10. Consequently, communication between the channels 33 and 35 may be prevented by means of a land or flange of the slide member 24, so that fluid has access only to one of the channels, as will be hereinafter explained.

A second supply opening 36 is located below the third channel 35, with the distance from the lower edge of the channel 35 to the upper edge of the supply opening 36 at least equalling the axial dimensions of the channel openings.

A third supply opening 37 is located below the second supply opening 36 and is, as are the first and second supply openings 34 and 36, arranged for supplying pressure fluid in some positions of the slide member 24.

As will be seen from Figure 1 the supply opening 37 is restricted downwardly by a substantially triangular section, whereby a special effect, which will be later referred to, is obtained. It may be mentioned that the opening into the upper chamber 27 from the branch channel 26 as defined by the edge 28 is of a similar triangular, downwardly tapering section.

The discharge conduit 17 from the third motor circuit 11 communicates with a channel 38 which opens into the lower end of the bore 23 below the third supply opening 37. The main discharge conduit 18 opens into the lower chamber 25 through a channel 39 in the lower end of the housing 22 of the manual control valve 3.

The valve stem 29 of the slide member 24 is, at its upper end, provided carrying a yoke 40 with a pivot pin 41 by means of which the end of a link 42 is connected to the slide member. The opposite end of this link 42 is, by means of a pivot pin 43, linked to one end of a second link 44, which is keyed at its opposite end to a shaft 45 journalled in the housing 22. One end of this shaft 45 extends outside the housing, and a handle 46 is secured to this outer end of the shaft 45. The handle is guided by a guide or quadrant 47 upon which the different positions of the slide member are engraved.

By means of this handle 46, the slide member 24 may be displaced axially within the bore 23 and may be brought to different positions for establishing different flow paths, some of these different positions and the corresponding flow paths being shown in Figures 2 to 7. It will be readily apparent that the slide member 24 may be brought to any position between its extreme positions of Figure 2 and Figure 7.

For the sake of simplification, the parts 40 to 47 of Figure 1 are represented in Figures 2 to 7 by a rod 29a, which constitutes the manually operated means for adjusting the position of the slide member 24.

As mentioned, the slide member 24 is provided with flanges or lands integral with its stem 29. At its upper end, the stem 29 carries an upper top flange 48, while a lower top flange 49 is spaced from said upper top flange by a distance corresponding to the axial dimensions of the channel openings 33, 34. When the slide member 24 is in its lowermost position (Figure 2), the upper top flange 48 is located just below the upper edge 28.

Figure 3:
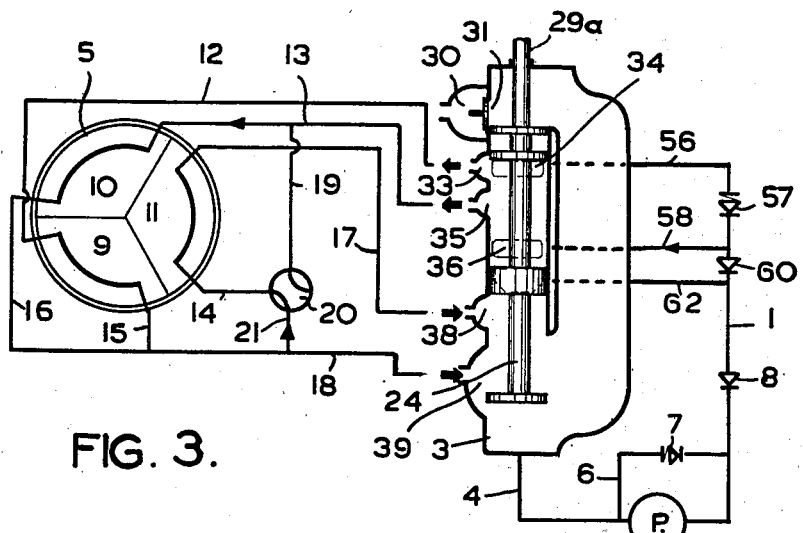

A broad intermediate closing flange 50 is spaced from the lower top flange 49 by a distance substantially corresponding to the distance in axial direction from the upper edge of the channel opening 33 to the upper edge of the lower supply opening 37. The intermediate closing flange 50 is axially dimensioned so that it is able to close the lower supply opening 37 fully, as shown in Figure 1 and 3.

The stem 29 of the slide member is terminated by a lower end flange 51 which is spaced from the lower end of the intermediate closing flange 50 by a distance which is selected so that, when the lower end flange 51 is moved up to a closing position against a seat 52 at the lower end of the cylinder bore 23, the intermediate closing flange 50 is disposed between the channel 35 and the supply opening 36 (Figure 7), thereby to permit upward flow from the channel 35 and downward flow from the supply openings 36 and 37 to the channel 38.

The flanges 48, 49, 50 and 51 of the slide member are all provided with circumferential grooves forming labyrinth packings, so that the different flow paths set up by the flanges are tightly separated from each other.

These grooves, apart from serving as a labyrinth packing, also function to prevent the slide member from being locked by a radially directed pressure against the wall of the bore 23 opposite a supply opening by reason of the fact that the grooves give access for lubricating fluid to such opposite wall and the area receiving such pressure is reduced.

The channels communicating with the feed and discharge conduits of the motor unit 5 are all arranged in the same radial direction in the housing 22 of Figure 1. In actual use, the main housing 22 of the manual control valve is connected to a motor unit of the construction shown in Figure 10 by means of flanges 53 and 54, whereby the different channels 30, 33, 34, 38 and 39 in the housing 22 are brought into communication in desired manner with the different channels and chambers in the motor unit. Hence, the conduits 12, 13, 18 and 17 are not really exposed conduits but only channels in a structure consisting of the housing 22 and the housing of the motor unit.

Similarly, the outlets 15 and 16 are also defined by channels in the housing of the motor unit communicating with the channel defining the common discharge conduit 18.

The main supply line 1 for pressure fluid from the pump is connected to an auxiliary housing 55 which, in the present embodiment, is shown as being integral with the main housing 22. This auxiliary housing 55 has an upper channel 56 which leads to the first supply opening 34. The upper channel 56 is closed by a special valve 57 against communication with an intermediate channel 58.

The intermediate channel 58 is arranged to supply pressure fluid from a chamber 59, which forms a continuation of the main supply line 1, to the supply opening 36, and to the upper channel 56, through a check valve 60 which is urged towards its seat by a lightly loaded return spring 61. Pressure fluid must pass through this check valve 60 before access from the chamber 59 to the intermediate channel 58 and the upper channel 56 is obtained.

A lower channel 62 leads from the chamber 59 directly into the supply opening 37, so that pressure fluid flowing through the opening 37 need not pass through the check valve 60.

In other words, the channel 62 short circuits the check valve 60 and the flow through this channel is independent of the pressure in the channels 56 and 58.

The valve 57 is shown in greater detail in Figure 8, and is there seen to include a casing 63 enclosing a valve stem 64 which at its lower end has a valve head 65 which is seated upwardly against a seat 66. The valve stem carries at its upper end a piston 67 which terminates, at its upper end, in a wider piston flange 68. The flange 68 defines an oil chamber 69 therebelow which by means of a pipe 70 is filled with discharge fluid from the branch channel 26, which as mentioned above contains fluid from the main discharge.

The valve stem 64 has an axial bore 71 which extends from the valve head 65, in communication with the intermediate channel 58, up to the upper end face of the piston flange 69 in communication with a chamber 72 above said flange. The valve stem 64 has an extension 73 which projects into the chamber 72 and terminates in an end flange 74 receiving the upper end of a control spring 75, while the lower end of spring 75 is engaged by a disc 76. This control spring is relatively heavily loaded, and its load may be regulated by threading flange 74 upon the upper end of the extension 73. This control spring acts to urge the valve head 65 upwardly to a closing position against the seat 66 so that a substantial pressure is necessary to open said valve, as will be explained hereinafter.

The correlation between the different areas subjected to hydraulic fluid in the valve 57 is so arranged as to obtain a certain desired opening characteristic of the valve 57 according to the status of the hydraulic system as a whole. Thus, the valve 57 is arranged to open and remain open if a given pressure differential is exceeded in one instance, and to open for another pressure differential in another instance. This operation of valve 57 is obtained by providing the stem 64 with three areas against which the supply fluid may act.

Thus, the supply pressure is applied from above against the area of the upper end face of the piston shoulder or flange 68 in any event, as pressure fluid has free access to the upper chamber 72 through the axial passage 71 of the valve stem 64 from the channel 58 even when the valve 57 is closed. The downward force acting in the valve is thus the pressure differential in the system, multiplied by the area of said piston flange 68.

The upward force from the control spring 75 also is applied under all circumstances.

In addition thereto, the pressure differential multiplied by the area of the valve head 65 acts upwardly, if the valve 57 is closed and the channel 56 is filled with discharge fluid.

If the valve 57 is open, or if the channel 56 is filled with pressure fluid, the supply pressure against the head 65 is released, and the supply pressure instead acts against the lower end face of the piston 67.

As will appear from Figure 8 the valve head 65 has a greater area than the piston 67, while the piston flange 68 has a greater area than the valve head 65.

In addition, a dynamic pressure may occur against the valve head 65 due to a flow of fluid into the channel 56 when the valve is open.

These pressure differentials resulting from the different areas of the head 65, piston 67 and flange 68 will therefore cause the valve to open at a lower pressure if pressure fluid is admitted to the channel 56 than if said channel is filled with discharge fluid. The reasons for this feature of the valve 57 will be referred to hereinafter.

Finally, the pressure responsive control device 20 should be mentioned. This device is a pressure responsive three-way valve which connects a conduit, i. e. the feed conduit 14, with one conduit (the branch 21) when the pressure is below a certain value, and with another conduit (the branch conduit 19) when the pressure is above said certain value. Such devices are known and need not be discussed in any greater detail herein. However, the system of Figure 1 preferably employs a device of the kind shown in Figure 10, and this device may be modified for use in the system of Figure 1, the modification consisting in coupling said device for obtaining a slightly different flow of the hydraulic fluid.

The device shown in Figure 10 comprises an upper chamber 102 and a lower chamber 103 which may communicate with each other when a valve member 111 is in its uppermost position, that is, toward the left, as viewed in Figure 10.

In the embodiment of Figure 1, the device of Figure 10 is connected so that the branch conduit 19 is led into the upper chamber 102 through a conduit 80 which is normally closed by the valve member 111 in the uppermost position, while the branch conduit 21 communicates with the lower chamber 103 by means of the conduit 85 of Figure 10.

The device is connected to the motor unit 5 so that the upper chamber 102 is in constant communication with the feed conduit 14, while the lower chamber 103, apart from its connection to the discharge by means of the conduit 85 through the branch conduit 21, is fully closed.

The position of the valve member 111 is controlled by the pressure differential between the fluid in the conduit 80 and the fluid in the conduit 85 so that the valve member is axially displaced if the pressure differential exceeds a predetermined value. For the correct understanding of how this is done, reference should be had to the co-pending application, Serial No. 470,924, filed November 24, 1954, wherein a full explanation of the operation of this control device is given.

Figure 2:
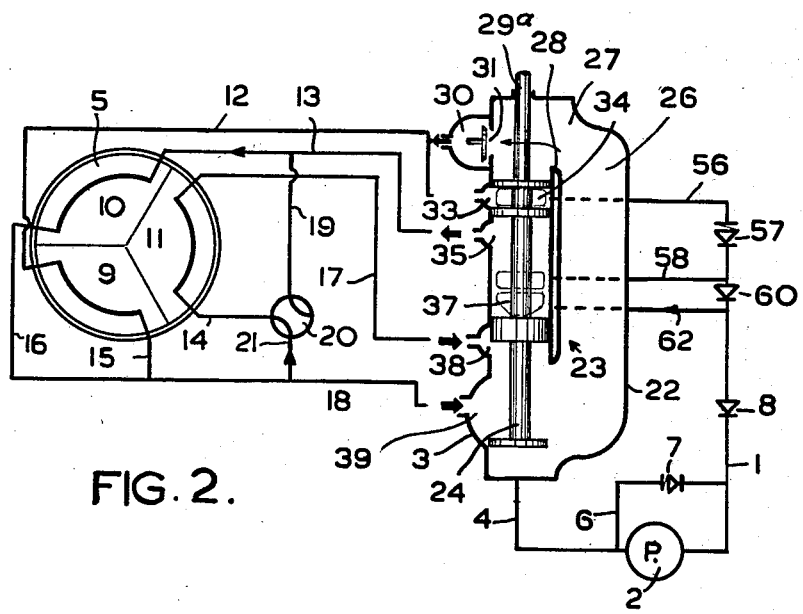
Figures 2 to 7 are diagrammatic views of the system according to the embodiment of Figure 1, showing different positions of the manual control valve with the parts of said valve somewhat simplified.

An explanation of the mode of operation of the system disclosed in Figures 1 to 8 will now be given. As mentioned above, the system according to the invention is arranged to give extreme hoisting speeds at lower loads, The manual control valve may at such lower loads be brought, by manual adjustment, to any of the following positions:

Top speed, with all pressure fluid passing through a single motor circuit (Figure 2).

Intermediate speed, with all pressure fluid passing through two motor circuits (Figures 1 and 3).

Figure 4:
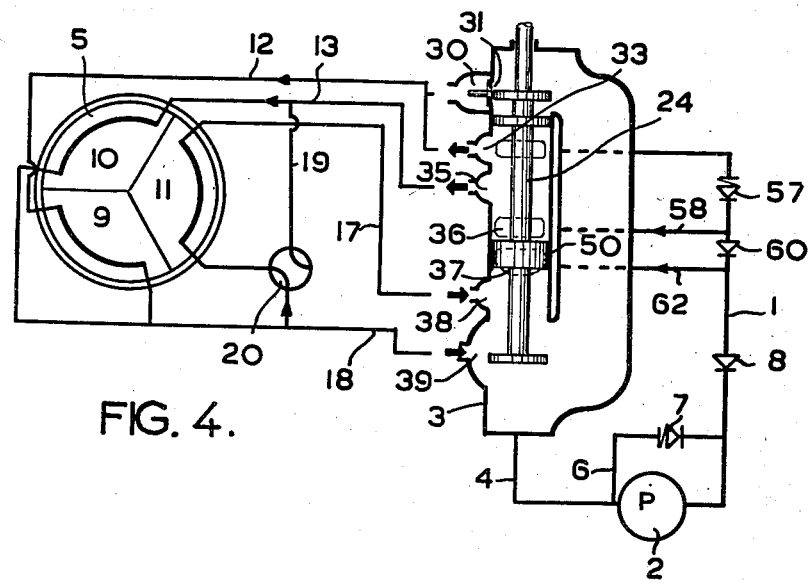

Slow speed, with part of the pressure fluid passing through a short circuit or by-pass (Figure 4).

Figure 5:
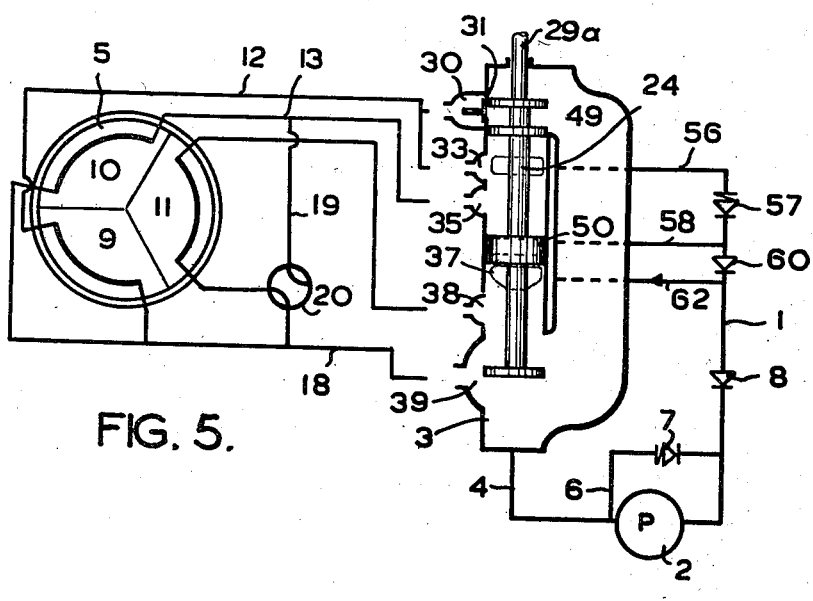

Stop, with all pressure fluid from supply conduit 1 passing through a short circuit or by-pass constituted by the channels 59 and 62, the opening 37 and the chamber 25 communicating with the return line 4 (Figure 5).

Figure 6:
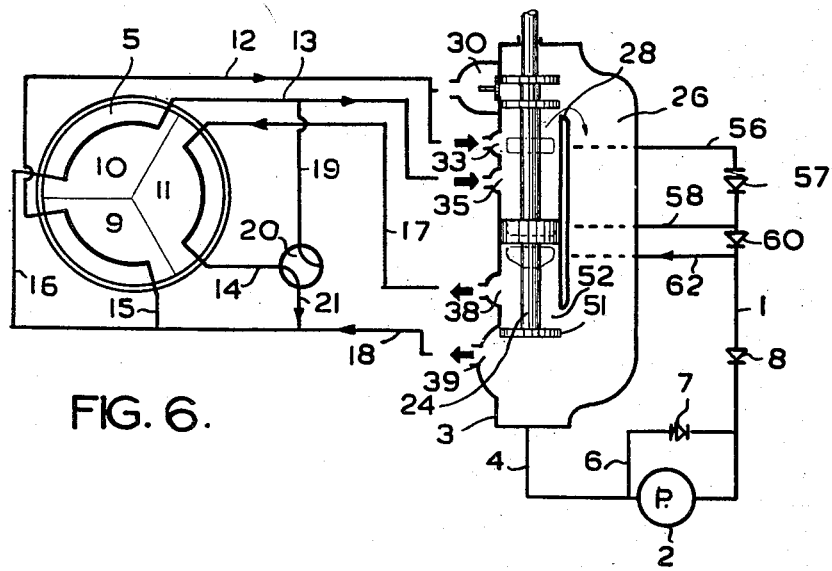

Controlled lowering, with all circuits in throttled communication with the discharge (Figure 6).

Figure 7:
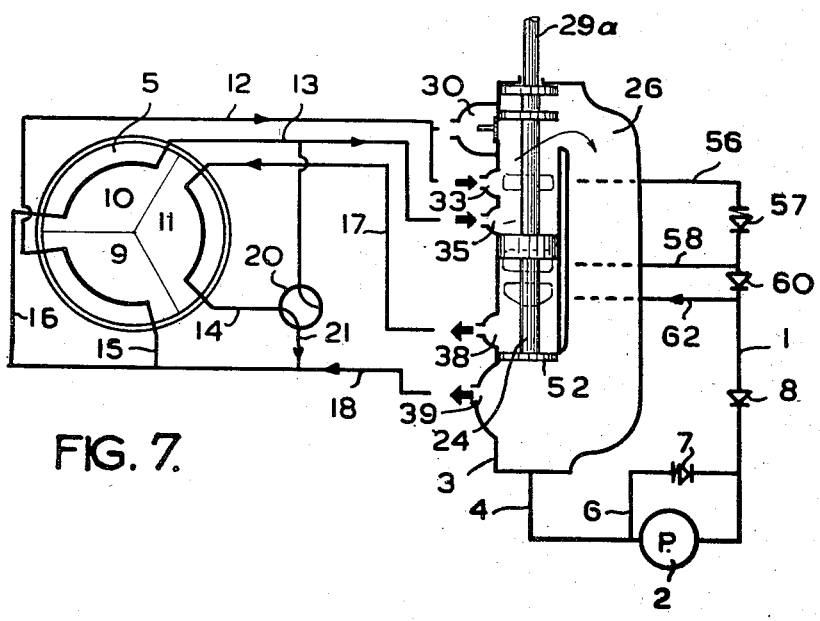

Reverse, with all pressure fluid passing in the opposite direction through a single motor circuit (Figure 7).

It is possible to obtain infinite speed variations by adjusting the slide member to any intermediate position between the abovementioned main positions.

The flow of fluid in the above identified main positions is discussed in detail in the co-pending application Serial No. 470,925, filed November 24, 1954, which has matured into Patent No. 2,736,170, issued February 28, 1956, and need not be discussed in the present specification. However, it may be desirable to describe here the mode of operation of the valve 57 when hoisting loads in the middle load range.

Some hydraulic duplex systems are known in the art, in which the safety valve blows if the manual control means are adjusted to force the pressure fluid from the pump through a single motor circuit (as in Figure 2 of this application) and the load is in the middle range. The manual control means must then be readjusted to a position wherein the second motor circuit also receives pressure fluid. If the pressure in the system then drops to a value below the maximum value, the load is hoisted.

In the present system, the possibility of adjusting the manual control means to a position wherein all fluid is supplied to a single circuit is prevented automatically as soon as the load exceeds a certain value. This is obtained by means of a flow line short circuiting or by-passing the means for disconnecting one circuit in order to obtain an additional speed range. As such disconnecting means, in the present system, is the slide member 24, the flow line in reality short circuits or by-passes this slide member.

This by-passing flow line is the channel 56 with its associated valve 57. This channel could have been connected to the feed conduit 12 directly, and should be regarded as a circuit line leading directly from the main supply line 1 into the feed conduit 12. Normally, this flow line is closed by the valve 57, but may be opened as follows:

If the slide member is positioned in the position of Figure 5 and is moved downwardly, the throttling of the opening 37 causes the pressure to increase until the pressure is sufficient to hoist the load. This occurs as soon as the back pressure resulting from the load against the vanes in the motor unit is exceeded. As soon as the position of Figure 3 is reached, no fluid can pass the fully blocked opening 37 and is forced to pass through the two motor circuits 9 and 10 opposing the back pressure.

It will be readily understood that, in this position, the fluid also has access to the interior of the channel 56 through the opening 34, although no actual flow occurs through said channel in this position. Consequently, both sides of the head 64 of the valve 57 receive the pressure of the supplied fluid, and it is the pressure fluid acting against the area of the lower end face of the piston 67, which in addition to the spring force counteracts the downward force resulting from the pressure fluid within the chamber 72.

Therefore, the valve 57 opens in the position of Figures 1 and 3 if the pressure exceeds a certain value. If the operator then tries to obtain an additional speed range by adjusting the slide member to the position of Figure 2, no additional speed is obtained, because the open valve 57 allows fluid to flow through the channel 56, through the opening 34 and into the channel 33, which is unrestricted by adjustment of the slide member 24 to the position of Figure 2. In other words, the disconnectable motor circuit 9 is supplied with pressure fluid in the position of Figure 2, even if the pressure exceeds a certain value.

Preferably, this value of the pressure is chosen so as to prevent the system from being subjected to overload if only one circuit is connected to the main supply. In the present embodiment, the opening pressure of the valve 57 with pressure fluid acting against the lower end face of the piston 67 is preferably chosen to be about one half of the maximum pressure which it is desired to apply to only one motor circuit.

This value of pressure is selected when the motor circuits 9 and 10 are of equal capacities, and it should be obvious to one skilled in the art to provide for other opening characteristics in the case of other capacities for the motor circuits. However, if the load is too small to open the valve 57 when two motor circuits are connected, the pressure will rise above the opening pressure for such valve in the position of slide members 24 shown in Figure 3, if the load exceeds more than one half of the load set as the maximum load for a single circuit. It should also be necessary to discuss the opening characteristics of the valve 57 in that event.

As soon as the slide member 24 is moved to the position of Figure 2, the area receiving the supply pressure from below in the valve 57 is the bottom surface of the valve head 65. As mentioned above, this area is greater than the area of the lower end face of the piston 67, so that a greater upward force upon the valve 57 results. If the differential area between the area of head 65 and the area of the lower end face of piston 67 is sufficiently great, the valve 57 will not open in the position of Figure 2 either.

If the above considerations only were to be taken into account, the area of the valve head 65 could be chosen quite freely. But another point also must be taken into consideration.

If the operator has lowered the winch hook too far, and has to hoist a load exceeding the maximum load for a single circuit, he may move the handle past the position of Figure 3 and to the position of Figure 2 without tightening the hook so that the full tightening first is obtained in the position of Figure 2.

Hence, the position of Figures 1 and 3 is passed with a load corresponding to empty hook, whereupon the back pressure from the load is fully applied to the system.

To compensate also for this possibility, the valve 57 is preferably arranged so that the difference between the area of the piston shoulder 68 and the area of the valve head 65 is about half the difference between the area of the piston flange or shoulder 68 and the area of the piston 67, whereby the valve 57 opens for a pressure in the position of Figure 2 about twice the opening pressure of Figures 1 and 3. In practice therefore, the valve 57 opens for substantially the same load in said two positions.

Another feature which should be mentioned in this connection is that, if the valve 57 opens in the position of Figure 2, the pressure drops due to the reconnection of the motor circuit 9. It is of course not desirable that the valve then close again, due to said drop in pressure. The valve 57 is therefore so arranged that the valve is kept open due to the channel 56 being filled with pressure fluid at a pressure higher than half the maximum pressure which it is desired to use with only one motor circuit connected.

As soon as the load drops below the maximum value, the valve 57 closes again.

As hereinbefore mentioned the device 20 is a pressure responsive device of the kind disclosed in the specification of the aforesaid co-pending application Serial No. 470,924, filed November 24, 1954, and its use in the present invention should be further explained.

The device 20 is of the kind remaining in changed over position, even when the pressure in the system drops far below the critical pressure at which the device connects the motor circuit which it controls.

How this is obtained, is described in the said co-pending application, Serial No. 470,924.

The feed conduit 14 of the third motor circuit 11 in the motor unit 5 is controlled by the device 20, so that feed conduit 14 is supplied with discharge 18 fluid from the main discharge through the branch conduit 21, as long as the pressure differential between the pressure in the feed conduit 13 and the pressure in the discharge 18 remains below a certain value.

As soon as the pressure differential between conduit 13 and discharge 18 exceeds said certain value, the device 20 is changed over or actuated to another position, whereby the feed conduit 14 is connected to the branch conduit 19, while the communication with the branch conduit 21 is closed.

Thus, if the slide member is moved downwardly from the stop position of Figure 5 towards the position of Figure 3, the pressure is increased according to the back pressure resulting from the load. Normally, the load acts upon the vanes of the motor circuits 9 and 10, but it is now assumed that the back pressure exceeds the desired maximum pressure and thus also the change over pressure of the device 20. Thus, with the slide member 24 at a certain point between the position of Figure 5 and the position of Figure 3, the throttling of the opening 37 is so great that the change over pressure is exceeded, and the device 20 consequently changed over into connecting position. The back pressure of the load is thereby distributed over all three motor circuits to which the pressure fluid is supplied. When the position of Figures 1 and 3 is reached, the speed will be equal to two-thirds of the hoisting speed with only two motor circuits connected, provided that the circuits are of equal capacities.

As the present system contains two pressure responsive control means, namely the pressure responsive control device 20 and the valve 57, which both may be set to give different response pressures, it is obvious that the speed characteristics in the intermediate load range may be varied by varying the relative pressure responses. Usually, it will be preferred to use maximum pressures in the different speed stages in the order of about 20 kg./cm.$^2$, while the safety valve 7 usually is set to blow at about 35 kg./cm.$^2$.

Under these circumstances, the pressure responsive means may compete in some instances.

If the load is hoisted with a tightened hook line before the position of Figure 2 is reached, the operations of the device 20 and the valve 57 can be ignored, as the valve 57 always opens in the position of Figure 3 if the pressure in this position has a certain relationship to the maximum pressure desired, usually half the maximum pressure. The device 20 will almost never be set to change over at a pressure lower than the response pressure of valve 57 so that valve 57 opens first.

However, it is also possible to provide the valve 57 with other opening characteristics, so that the device 20 is changed over first, should this operation be desired.

But it should be mentioned that even if initial actuation of device 20 is preferred, competition between device 20 and valve 57 may still occur if the operator starts with an extremely lowered hook and passes the position of Figure 3 without load. The opening characteristics of the valve 57, as described in connection with Figure 2, will then be dominant over the change over pressure of the device 20.

In addition to the above, the time of response should also be considered.

Firstly, the device 20 is arranged to change over at a pressure slightly exceeding the pressure necessary to open the valve 57 in the position of Figure 2.

Secondly, the response time of the device 20 is set slightly slower than the response time of the valve 57, in order to ensure that the valve 57 always opens first.

Therefore, the third motor circuit 11 controlled by the control device 20 will only be in use if the load exceeds two thirds of the maximum load for which the winch is designed.

The embodiment according to Figures 9 and 10, in which parts corresponding to those described in connection with Figures 1 to 8 are designated with the same reference numerals, will now be described.

The system according to this embodiment comprises a main supply line 1 which supplies pressure fluid from a pump 2 to a manual control valve 3 adjustable for distribution of pressure fluid between a main return line 4 leading back to the pump, and a motor unit 5. A relief line 6 with a safety valve 7 leads from the main supply line 1 to the main return line 4 and a check valve 8 determining the flow direction is arranged in the main supply line 1 after the relief branch 6.

Three motor circuits 9, 10 and 11 of the motor unit 5 are controlled by the manual control valve 3 as well as a pressure responsive control device 20 and a valve 57.

The feed conduit 14 of the third motor circuit branches off from the control device 20 as in the preceding embodiment.

In addition to the branch 19 leading to the control device 20, the feed conduit 13 to the motor circuit 10 also has a second branch conduit 80 extending to a second pressure responsive control device 81, which controls the supply of pressure fluid to a fourth motor circuit 82. This motor circuit has a feed conduit 83 in constant communication with an upper chamber 102 of the control device 81, and an outlet conduit 84 in constant communication with a lower chamber 103 within the control device 81.

The upper chamber 102 may communicate with either the lower chamber 103 through an opening 108, or with the branch conduit 80. This communication is controlled by a valve member 111, the position of which is controlled by the pressure differential between the branch conduit 80 and the discharge conduit 85.

As is shown in Figure 10, the motor unit forming the motor circuit 82 has a housing 201 enclosing a rotor 202 with radial wings or vanes 203. The motor contains three motor chambers 204, 205 and 206 having individual inlet channels 207, 208 and 209, respectively. The outlets from the chambers 204 and 205 are joined into a common outlet channel 210, while the outlet from the third chamber 206 leads into a separate outlet channel 211. The interior of the housing 201 is provided with partitions 212 separating the different channels, and the rotor 202 is provided with bolt holes 213 for securing the rotor to the shaft of a winch barrel or drum.

All channels open at a face 214 of a flange 215 provided on the housing and by means of which the motor unit may be connected to a control means controlling the unit.

In the embodiment of Figure 9, the motor unit 5 is a three chambered motor of the kind shown in Figure 10. By comparing Figure 1 and Figure 10, it will be seen that apart from the different scales used in these drawings, the flanges 53, 54 of valve 3 may be connected directly to the flange face 214 of flanges 215 of motor housing 201, whereby the channels 33 and 35 register with the feed channels 207 and 208, respectively, while the feed channel 209 of the third chamber is closed. The outlet channels 211 and 210 may be registered with the channels 38 and 39, respectively, whereby the desired communication is obtained.

The rotor of motor unit 5 is then secured to one end of the shaft of the winch barrel, by means of the bolt holes 213, while another motor unit forming the motor circuit 82 is attached to the opposite end of the shaft of the winch barrel or drum. This other motor unit is then exactly as shown in Figure 10, as its associated pressure responsive control device 81 is connected to the flange face 214.

The first control device 20 is connected to a side of the motor housing of the motor unit 5 with its upper chamber 102 in communication with an inlet to the third motor circuit 11, while the lower chamber 103 is turned towards a blind face for closing the lower chamber.

Since the embodiment of Figure 9 contains four circuits 9, 10, 11 and 82, the triple chambered motor unit forming the circuit 82 being coupled as a single circuit, the system of Figure 9 represents a quadruplex system.

This quadruplex system will now be described by way of example for use in a six-ton winch, wherein the maximum power available for hoisting amounts to 80 H. P. (In reality, the motor driving the pump must have a greater power output in order to compensate for frictional losses, etc.)

At the maximum load of six tons, such power is able to hoist with a hoisting speed of one meter per second.

The control devices 20, 81 are set to open slightly above 20 kg./cm.² with the opening pressure or change over pressure of the device 81 being slightly higher, and the response time slightly lower than for the device 20, in order that the device 20 shall be changed over first. The valve 57 is set to open at pressures slightly below the change over pressure for device 20 as well as the device 81, and to respond slightly quicker than both devices 20 and 81, when the valve 57 opens with the slide member 24 in the position of Figure 2.

The delay in response only amounts to seconds or even fractions of a second.

The operator starts moving the handle of valve 3 to the hoisting position, and the slide member 24 is adjusted downwardly. The pressure increases due to the back pressure of the load, and after a lapse equivalent to the response delay, all four circuits 9, 10, 11 and 82 are supplied with pressure fluid so that the load is hoisted. As soon as the position of slide member 24 shown in Figure 3 is reached, all pressure fluid is forced through the motor circuits, and the maximum speed available with this load is reached.

If the load is above three tons, the pressure will always exceed ten to twelve kg./cm.², so that the valve 57 always remains in open position.

If it is desired to stop hoisting, and eventually start lowering, the operator moves the handle of valve 3 to stop position so that the slide member 24 is moved to the position of Figure 5. The back pressure resulting from the load will be maintained in all feed conduits between the check valve 60 and the vanes of the motors, so that sufficient pressure is present to maintain the devices 20 and 81 in changed over positions. The pressure fluid, however, by-passes the check valve 60 and flows practically without any drop in pressure through the short circuit or by-pass constituted by chambers 59 and 62, opening 37 and chamber 25 communicating directly with the return line.

It should be noted that the efficiency of the present system is greatest at these higher loads, as no parts of the system are moved in idle position.

If the load is lowered, no substantial drop in pressure is obtained, so that the changed over devices 20 and 81 still remain in their changed over positions.

If the load carried by the six-ton winch is between two and three tons, the three circuits 9, 10 and 11 suffice for hoisting the load. As indicated above, these circuits are connected first, and as soon as the circuits 9, 10 and 11 are connected, the pressure in the system drops below the change over pressure of the device 81. The circuit 82 controlled by the device 81 remains idle, and all pressure fluid is forced through only three chambers, instead of six chambers as at the maximum load.

Consequently, the double hoisting speed is obtained with the smaller loads, that is, a speed of 2 meters per second.

It should be again noted that this speed is reached at the position of slide member 24 shown in Figure 3, and as the valve 57 is opened, no further speed increase may be obtained.

If the load amounts to between one ton and two tons, the above mentioned setting of the pressure responsive devices 20 and 81 will provide that all pressure fluid only passes through the motor circuits 9 and 10, as the pressure responsive control devices 20 and 81, are not changed over. The speed will amount to three meters per second with the slide member 24 in the position of Figure 3 as well as the position of Figure 2.

If the load is lower than one ton, a hoisting speed of three meters per second is obtained with the slide member 24 in the position of Figure 3, which speed may be increased to six meters per second by moving the handle and hence the slide member to the position of Figure 2.

In other words, the maximum speed obtainable is varied in a step-by-step manner in the ratio 6:3:2:1 according to the load. At each step, the speed may be varied infinitely down to the minimum by manually adjusting the position of the slide member 24 between the positions of Figure 5 and Figure 3 or 2.

However, it should be noted that although the above mentioned settings of the pressure responsive control devices 20 and 81 are regarded as the most favourable at present, the different step ratios may be changed simply by changing the settings of the different control springs. If desired, the motor circuit 9 may also be set to be disconnectable at all loads except the maximum load of between five and six tons. In that event, it is mostly desirable to lag the opening of the valve 57 in comparison to the change over of the devices 20, 81. Also, it is desirable to alter the described relative proportions of the areas subjected to pressure in the valve 57.

Such changes should however be within the reach of one skilled in the art. Also other changes are possible, within the scope of the appended claims.

What I claim is:

1. A hydraulic transmission system for a winch, comprising a source of pressure fluid, at least two fluid motor circuits connected in aiding mechanical relation to each other, an individual feed conduit for hydraulic fluid in each of said fluid motor circuits, a fluid circuit, manually adjustable control means, a main supply line in said fluid circuit from said source to said manually adjustable control means, a return line in said fluid circuit from said manually adjustable control means to said source, a short circuit to said return line, said manually adjustable control means being adapted to control the feed of pressure fluid to a first one of said motor circuits by distributing the supplied pressure fluid between the feed conduit of said first motor circuit and the short circuit to said return line, a check valve located in said feed conduit of the first motor circuit at a point between the junction of said feed conduit with said short circuit and said first motor circuit, a branch constituting the feed conduit of said second motor circuit and leading from a point between said check valve and the inlet of said first motor circuit and to the inlet of a second motor circuit, and pressure responsive means for closing said branch at pressure differentials between the pressure in the feed conduit of said first motor circuit and the pressure of said return line below a given value.

2. A system according to claim 1, wherein said pressure responsive means for closing said branch below a given value, after first opening remains open at pressures substantially lower than said given value, the closing pressure after opening being substantially the idling pressure of the system with all pressure fluid supplied to the short circuit back to said source.

3. A hydraulic transmission system for a winch, comprising a source of pressure fluid, at least three fluid motors connected in aiding mechanical relation to each other, an individual feed conduit in each of said fluid motors, a fluid circuit, manually adjustable control means, a main supply in said fluid circuit line from said source to said manually adjustable control means, a return line from said manually adjustable control means to said source, a short circuit to said return line, said manually adjustable control means being adapted to control the feed of pressure fluid to a first one and a second one of said motor circuits by being manually adjustable to a first position in which pressure fluid is distributed in parallel between the feed conduits of said first and second motor circuits and the short circuit past said feed conduits to said return line, to a second position in which all pressure fluid is supplied to the feed conduits of said first and second motor circuits in parallel, and to a third position in which all pressure fluid is supplied to a second one of said motor circuits, said manually adjustable control means further comprising manually adjustable choke means for controlling in said first position the flow of pressure fluid through said short circuit, a branch leading from the feed conduit of said second motor circuit to the inlet of a third motor circuit and constituting the feed conduit of said third motor circuit, and pressure responsive control means for closing said branch at pressures below a given value and allowing pressure fluid to flow through said branch as soon as the pressure exceeds said given value.

4. A hydraulic transmission system for a winch, comprising a source of pressure fluid, at least three fluid motors connected in aiding mechanical relation to each other, an individual feed conduit in each fluid motor, a fluid circuit, manually adjustable control means, a main supply line in said fluid circuit from said source to said manually adjustable control means, a return line from said manually adjustable control means to said source, a short circuit to said return line, said manually adjustable control means being adapted to control the feed of pressure fluid to a first one and a second one of said motor circuits by being manually adjustable to a first position in which the pressure fluid is distributed in parallel between the feed conduits of said first and second motor circuits and the short circuit past said feed conduits to said return line, to a second position in which all pressure fluid is supplied to the feed conduits of said first and second motor circuits in parallel, and to a third position in which all pressure fluid is supplied to the second one of said motor circuits, said manually adjustable control means further comprising manually adjustable choke means for controlling in said first position the flow of pressure fluid through said short circuit, a first branch leading from the feed conduit of said second motor circuit to the inlet of a third motor circuit and constituting the feed conduit of said third motor circuit, first pressure responsive control means for closing said first branch at pressures below a first given value and allowing pressure fluid through said first branch as soon as the pressure in said first branch exceeds said first given value, and a second branch leading from the feed conduit of said second motor circuit to the feed conduit of said first motor circuit, said second branch being normally closed by second pressure responsive control means responsive for allowing pressure fluid in said third position through said second branch at pressures in said second branch exceeding a second given value.

5. A system according to claim 4, wherein said first and second pressure responsive control means after opening remain open at pressures below their opening pressures, said second pressure responsive control means closing the corresponding second branch at a pressure higher than the reclosing pressure of said first pressure responsive control means.

6. A system according to claim 4, wherein said first pressure responsive control means has an opening time response for opening different from the opening time response of said second pressure responsive control means, said difference in opening time responses allowing one of said control means to respond in advance of the other even although the initial pressure before any opening exceeds both said first and second given values.

7. A hydraulic transmission system comprising a source of pressure fluid, at least three fluid motors connected in aiding mechanical relation to each other, separate feed conduits for each fluid motor, a fluid circuit, manually adjustable control means, a main supply line in said fluid circuit from said source to said manually adjustable control means, a return line from said manually adjustable control means to said source, the manually adjustable control means being adapted for manual control of the feed of pressure fluid to a first one of said motor circuits, a first branch leading from the feed conduit of said first motor circuit and to the inlet of a second motor conduit and constituting the feed conduit of said second motor circuit, a second branch leading from the feed conduit of said first motor circuit and to the inlet of a third motor circuit and constituting the feed conduit of said third motor circuit, a first pressure responsive control means for closing said first branch at pressures below a first given value, and a second pressure responsive control means for closing said second branch at pressures below a second given value, said first and second pressure responsive control means being adjustable to let either the first control means respond in advance of the second control means at a given pressure, and to let the second control means respond in advance of the first control means at a given pressure, whereby the sequence of response is adjustable.

8. A hydraulic transmission system according to claim 7, wherein said first and second given values are independently adjustable.

9. A hydraulic transmission system according to claim 7, wherein the time response of said first and second pressure responsive control means are adjustable to differently timed responses.

10. A system according to claim 4, wherein said three motor circuits are radially extending chambers in a hydraulic fluid motor having a rotor with vanes cooperating with said chambers, each chamber having a separate inlet connected to an individual feed conduit.

References Cited in the file of this patent

UNITED STATES PATENTS

| | | |
|---|---|---|
| 2,283,516 | Tyler | May 19, 1942 |
| 2,370,526 | Doran | Feb. 27, 1945 |
| 2,374,588 | Doran | Apr. 24, 1945 |
| 2,398,265 | Tyler | Apr. 9, 1946 |
| 2,618,291 | Vestre | Nov. 18, 1952 |